(12) United States Patent
Singh et al.

(10) Patent No.: US 7,717,220 B2
(45) Date of Patent: May 18, 2010

(54) CROSSMEMBER CENTER SECTION

(75) Inventors: Niranjan Singh, Ann Arbor, MI (US); Patrick DiMarco, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 11/700,233

(22) Filed: Jan. 31, 2007

(65) Prior Publication Data

US 2008/0179851 A1    Jul. 31, 2008

(51) Int. Cl.
*B62D 21/03*    (2006.01)
*B62D 21/11*    (2006.01)

(52) U.S. Cl. .................. 180/312; 280/781; 280/785; 180/311; 180/374; 180/376; 180/377; 180/379; 180/380; 29/897.2

(58) Field of Classification Search ................. 280/781, 280/785; 180/311, 312, 374, 376, 377, 379, 180/380; 29/897.2
See application file for complete search history.

(56) References Cited

U.S. PATENT DOCUMENTS

| | | | |
|---|---|---|---|
| 2,939,540 A * | 6/1960 | Halberg et al. ............. 180/381 |
| 3,292,968 A | 12/1966 | Hilabrand et al. | |
| 3,806,149 A | 4/1974 | Huszar | |
| 5,660,428 A | 8/1997 | Catlin | |
| 5,700,033 A | 12/1997 | Beckman | |
| 6,698,775 B2 | 3/2004 | Ness | |
| 2001/0022444 A1 * | 9/2001 | Lapic ......................... 280/784 |
| 2003/0000762 A1 * | 1/2003 | Lecuit ........................ 180/311 |
| 2005/0104356 A1 * | 5/2005 | Vincenti ..................... 280/795 |
| 2006/0012162 A1 | 1/2006 | Werner et al. | |
| 2007/0045034 A1 * | 3/2007 | Kim .......................... 180/379 |
| 2007/0071587 A1 * | 3/2007 | Baumann et al. ........... 414/680 |

OTHER PUBLICATIONS

NASCAR Truck Racing Rulebook for 2006 Season, National Association for Stock Car Auto Racing, Inc., 2005, p. 67.
NASCAR Truck Racing Rulebook for 2009 Season, National Association for Stock Car Auto Racing, Inc., 2009.

* cited by examiner

*Primary Examiner*—Paul N. Dickson
*Assistant Examiner*—Barry Gooden, Jr.
(74) *Attorney, Agent, or Firm*—O'Brien Jones, PLLC

(57) ABSTRACT

A center section for a crossmember of a vehicle chassis comprises a driveshaft hoop, crossmember attachment areas extending generally from opposing sides thereof, and trailing arm mounts on either side of the driveshaft hoop for attachment of one or more trailing arms to the center section. The crossmember attachment areas have heights that allow attachment of crossmember portions to the center section at offset heights. A method of constructing a crossmember of a vehicle chassis comprises providing a center section having crossmember attachment areas of predetermined heights extending generally from opposite sides of a driveshaft hoop, and attaching crossmember portions within the crossmember attachment areas at heights that are offset from each other.

12 Claims, 6 Drawing Sheets

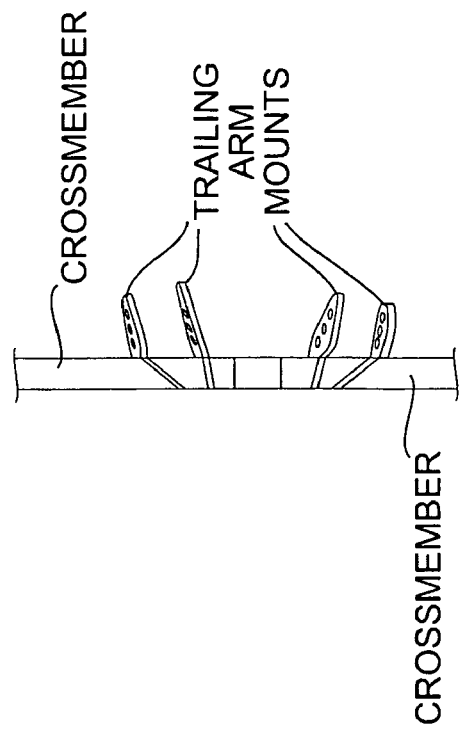
FIG. 2D *PRIOR ART*
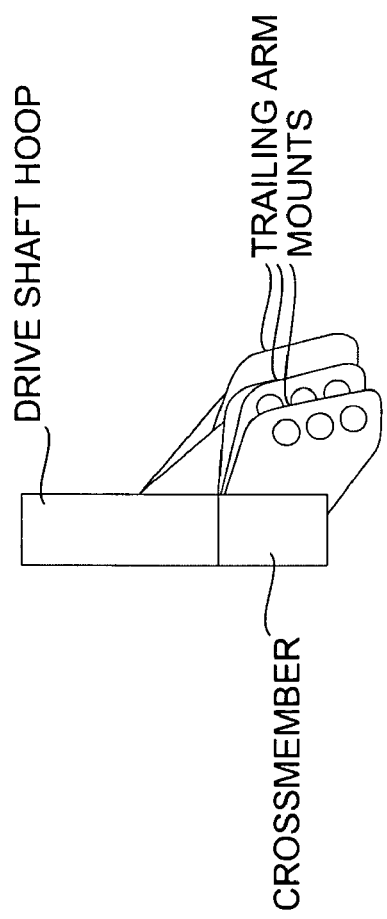
FIG. 2C *PRIOR ART*

CROSSMEMBER CENTER SECTION

FIELD OF THE INVENTION

This invention relates to an improved crossmember for a vehicle. More specifically, this invention relates to a center section of a vehicle crossmember that is common for different frame rail heights.

BACKGROUND OF THE INVENTION

NASCAR racecars are primarily built in a two-step process. The first step is construction of the chassis, which consists of a central roll cage, a front clip, and a rear clip. A typical chassis is illustrated in FIG. 1. The second step is attachment of an outer body shell to the chassis. The chassis is constructed of round and square rails with varying thicknesses and dimensions. The size and shape of most of the rails (also called "tubes") used in the chassis is strictly mandated by the NASCAR sanctioning organization.

Construction of the chassis is itself a four-step process. First, the trailing arm crossmember (TACM) is constructed and is used to set the reference frame of the car. In other words, application of all of the subsequent parts in the chassis is based on the dimensions and position of the TACM. The next step is building the front and rear clips that attach to the main longitudinal frame rails. The front and rear clips are constructed according to suspension "hard points" requirements of each team. The frame rails are also built to suit the heights required for different speedways. Different corners of a vehicle chassis can have different resting heights depending on the requirements of a given speedway. In the third step, the central roll cage is constructed. The roll cage consists entirely of round tubes of varying sizes and thicknesses. Lastly, the firewalls, floor pans, and roll cage are attached to the frame rails and the front and rear clips to complete the chassis. Traditional welding techniques are used according to NASCAR specifications during chassis construction.

Due to varying frame rail height requirements and because all of the subsequent parts in the chassis are dependent on the dimensions of the TACM, the construction of the TACM is an important step in the chassis construction process. The TACM consists of, as illustrated in FIGS. 2A-2D, a driveshaft hoop, trailing arm (also called "truck arm") mounts, and the crossmember portions that attach to the frame rails. Support gussets may be use to strengthen the crossmember. Because the shape of the TACM changes for different frame rail heights and may require offset heights of crossmember portions, chassis construction must be changed for each configuration of the chassis. The height of the crossmember can be described as its distance from the ground when in use. This can also be referred to as vertical height of the crossmember. Also, the crossmember is cut and trimmed separately for each configuration. This can increase the cost, timing, and consistency of the TACM.

A trailing arm suspension is a vehicle suspension that includes one or more arms that are connected between the axle and the chassis (here, the crossmember of the chassis). The arms generally extend from the rear axle to a location on the chassis (the crossmember) that is forward thereof. Two arms are usually used.

SUMMARY OF THE INVENTION

The invention relates to a center section for a crossmember of a vehicle chassis comprising a driveshaft hoop, crossmember attachment areas extending generally from opposing sides thereof, and trailing arm mounts on either side of the driveshaft hoop for attachment of one or more trailing arms to the center section. The crossmember attachment areas have heights that allow attachment of crossmember portions to the center section at offset heights.

The invention also relates to a method of constructing a crossmember of a vehicle chassis comprising providing a center section having crossmember attachment areas of predetermined heights extending generally from opposite sides of a driveshaft hoop, and attaching crossmember portions within the crossmember attachment areas at heights that are offset from each other.

The invention further relates to a method of manufacturing a center section of a crossmember of a vehicle chassis comprising providing crossmember attachment areas extending generally from opposing sides of a driveshaft hoop, and providing trailing arm mounts on either side of the driveshaft hoop for attachment of one or more trailing arms to the center section. The crossmember attachment areas have heights that allow attachment of crossmember portions to the center section at offset heights.

The invention may include the heights of the crossmember attachment areas being offset from each other, the center section comprising cast steel, and/or the crossmember portions being inserted into the crossmember attachment areas at the desired heights and then welded within the crossmember attachment areas.

BRIEF DESCRIPTION OF THE DRAWINGS

The accompanying drawings, which are incorporated herein and form part of the specification, illustrate the prior art and the present invention and together with the description, further serve to explain the principles of the invention and to enable a person skilled in the pertinent art to make and use the invention.

FIG. 2C is a side view of the center section of FIG. 2A.

FIG. 2D is a bottom view of the center section of FIG. 2A.

DETAILED DESCRIPTION OF THE INVENTION

Figure 1:
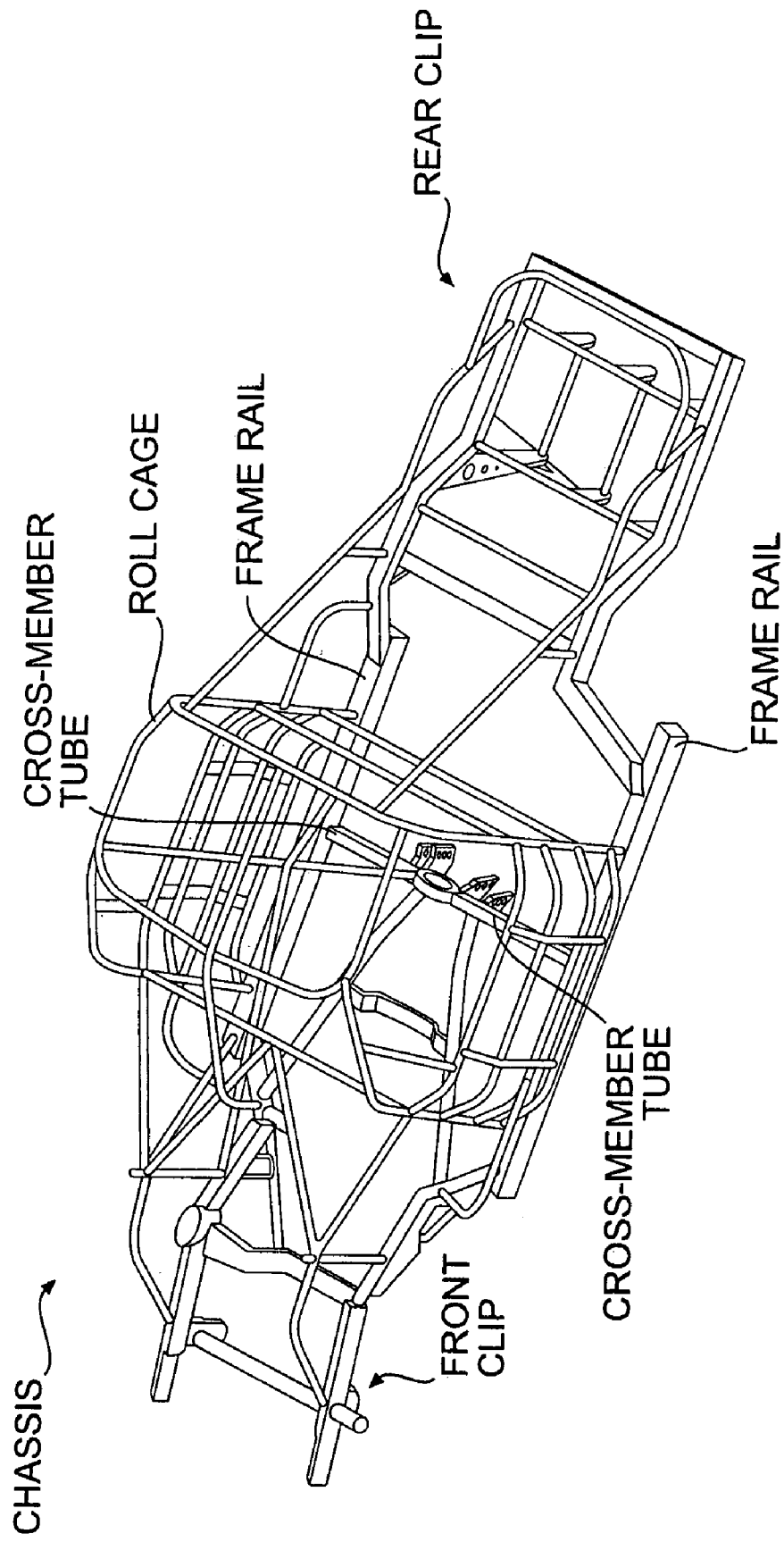
FIG. 1 is a perspective view of a prior art NASCAR racecar chassis.
Figures 2A, 2B:
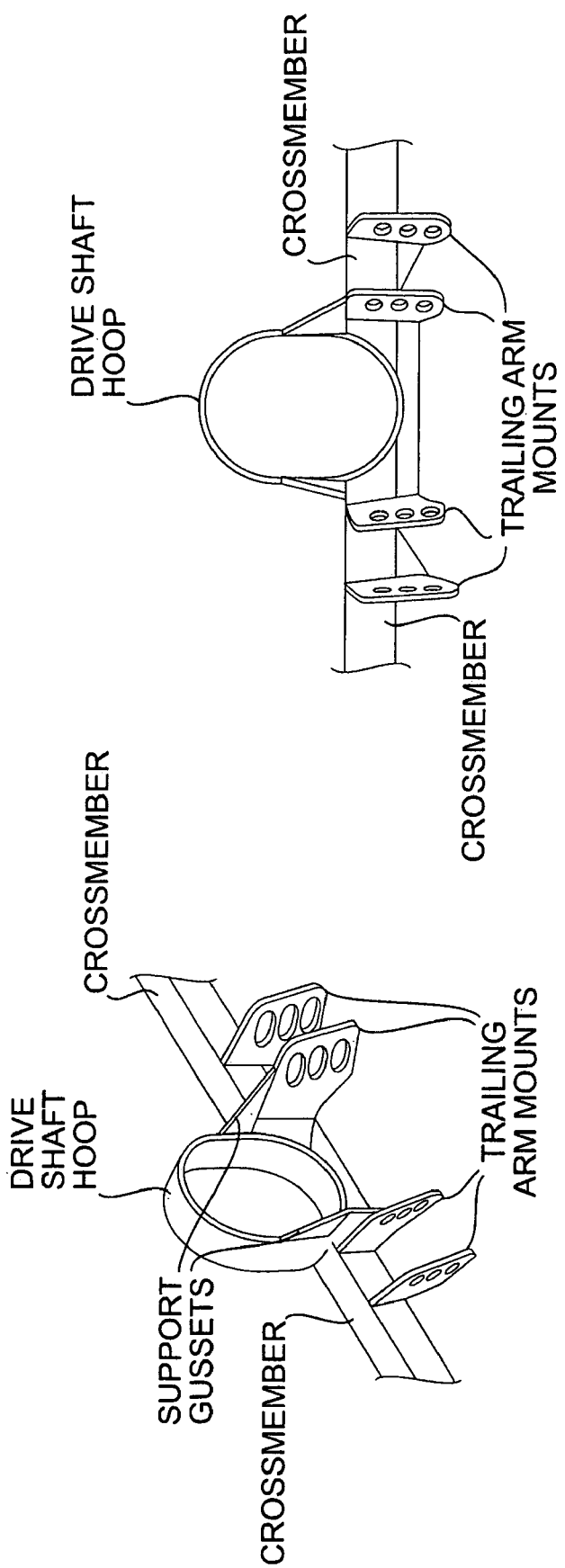
FIG. 2A is a perspective view of a center section of a prior art crossmember.
FIG. 2B is a front view of the center section of FIG. 2A.
Figure 3:
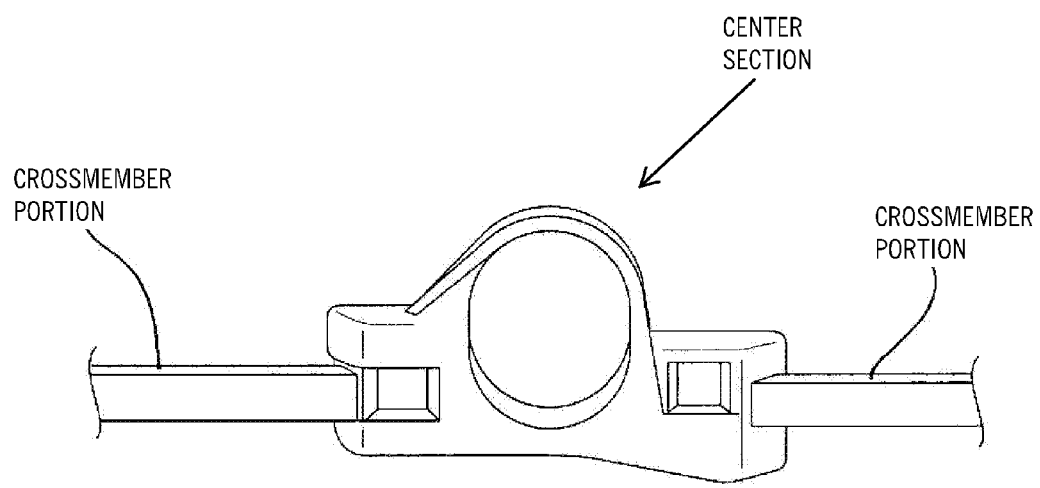
FIG. 3 illustrates an embodiment of a crossmember center section of the present invention, attached to the rest of the crossmember.
Figure 4A:
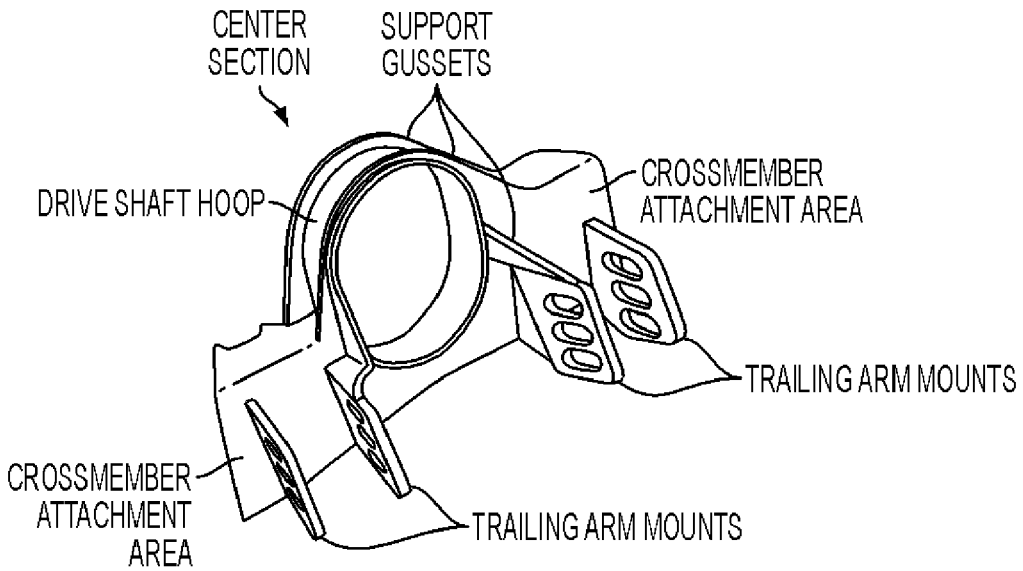
FIG. 4A is a perspective view of an embodiment of a crossmember center section of the present invention.
Figure 4B:
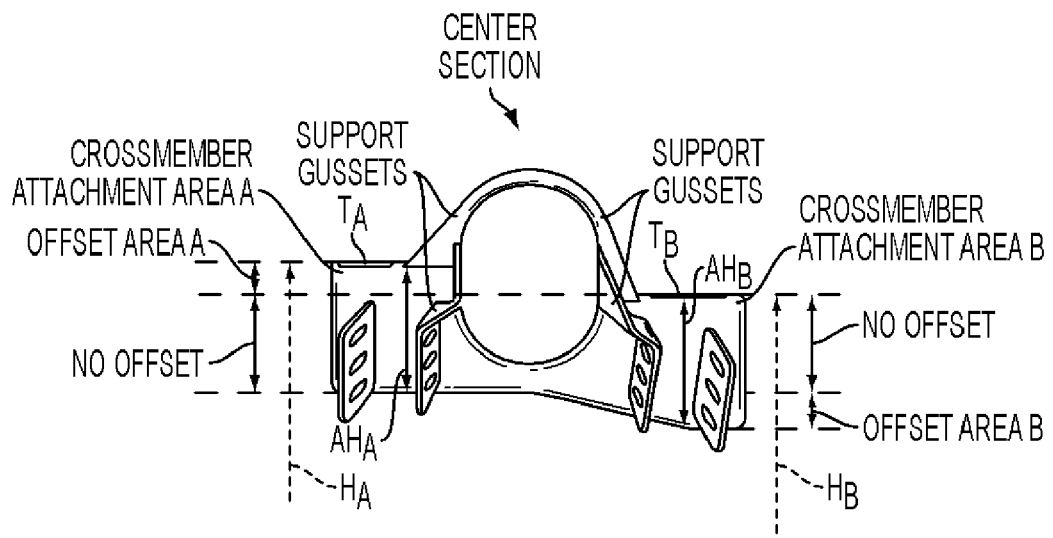
FIG. 4B is a front view of the center section of FIG. 4A.
Figures 4C, 4D:
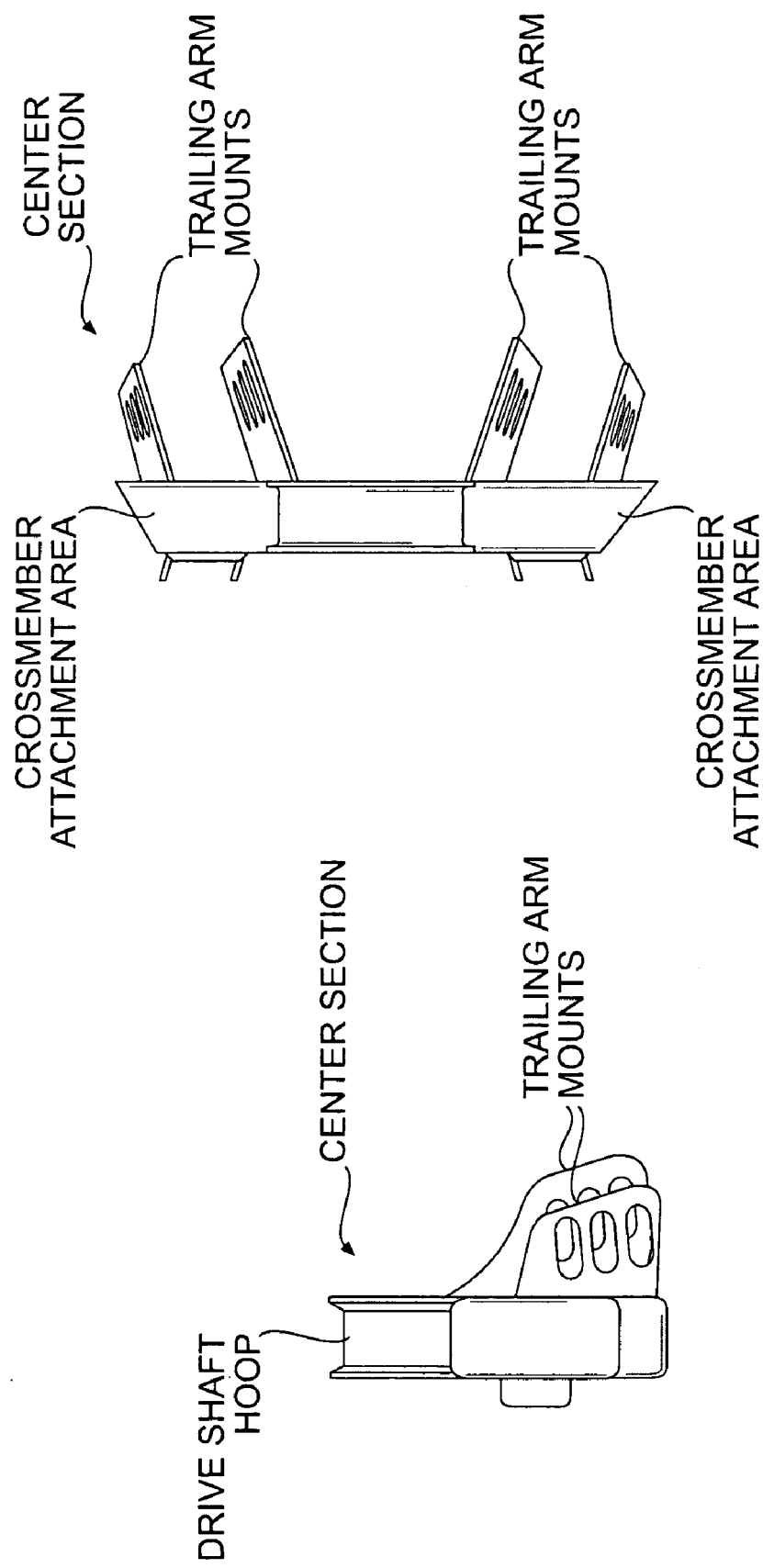
FIG. 4C is a side view of the center section of FIG. 4A.
FIG. 4D is a bottom view of the center section of FIG. 4A.

In accordance with an embodiment of the present invention, a center section of a TACM is used to accommodate a variety of frame rail heights that are necessary based on varying NASCAR speedway requirements. The square crossmember tubes extending between chassis frame rails (see FIG. 3) can be adjusted within the center section to accommodate differing frame rail heights and resulting differences in crossmember heights. Thus, the height of a crossmember attached to one side of the center section need not have the same height as a crossmember attached to the other side of the center section. As can be seen in FIGS. 3 and 4B, the crossmember attachment sections of the center section are offset to facilitate offset heights of the crossmembers. Thus, a fixed height of the center section accommodates a variety of heights for the crossmembers. In stating that the heights of the crossmember attachment sections of the center section are offset, the present invention contemplates a portion of the crossmember attachment sections of the center section being offset. In a case where the intended speedways would never require the crossmember to have a uniform height, the present invention also contemplates the crossmember attachment sections of the center section being completely offset—that is, having no overlap in height.

It is to be understood that the crossmembers will not always be offset. For example, on a road course like Watkins Glen International Speedway in New York, the crossmembers will not be offset. However, on an oval track with high banking like Bristol Motor Speedway in Tennessee, the crossmembers are offset. The amount of offset and height variation accommodated by the crossmember attachment areas of a center section in accordance with the present invention preferably allows a single center section to be used in all variations of NASCAR speedways—without the crossmember needing to be cut and trimmed separately for each configuration. Thus, the height of the crossmember attachment areas may vary, along with the offset, and remain within the scope of the invention. FIG. 3 illustrates offset crossmembers attached to an embodiment of a center section. This exemplary embodiment does not specifically illustrate trailing arm mounts on the center section.

Thus, a single center section can be use for all configurations without requiring cutting, trimming, or welding. This can reduce construction time significantly because of the reduced number of subcomponents compared with traditional methods of manufacturing TACMs. Also, having a common center section among configurations increases the build consistency among chassis. Because the amount of welding is reduced, the possibility of resulting local metal warping can also be reduced. The center section comprises a suitable strong material such as cast steel, aluminum, other metals, or carbon fiber.

During a race, a significant load is applied to the trailing arm mounts of the TACM. This can cause prior art mounts to deform and/or crack in the areas of welding. The center section of the present invention greatly increases stiffness and strength of the mounting area by requiring less welding during construction, particularly when cast, and therefore can reduce fatigue failures such as deformation and cracking.

As discussed above, FIG. 3 illustrates an embodiment of a center section of the present invention with offset crossmembers attached to its crossmember attachment areas. As can be seen, a vehicle driveshaft will extend through the driveshaft hoop at a fixed height, and the crossmember attachment areas will facilitate a variety of crossmember attachment heights, aligned or not, given the fixed height of the center section. The trailing arm mounts can have any suitable configuration to facilitate proper mounting of the trailing arms to the center section. The illustrated embodiment shows three mounting holes to allow adjustable trailing arm attachment. More or less holes are contemplated, as are other suitable configurations for the mounting area.

FIGS. 4A-4D illustrate an embodiment of a center section of the TACM of the present invention. As shown in FIG. 4B, the center section includes crossmember attachment area A and crossmember attachment area B extending in opposite directions from either side of a driveshaft hoop. Crossmember attachment area A and crossmember attachment area B have top surfaces $T_A$ and $T_B$, respectively. The top surfaces $T_A$ and $T_B$ having vertical heights (distances from the ground (not shown) when in use) $H_A$ and $H_B$, respectively. Crossmember attachment area A has an area height $AH_A$ and crossmember attachment area B has an area height $AH_B$ that can be, as illustrated, the same as area height $AH_A$. An area of "no offset" is indicated, wherein crossmember portions can be attached to the center section at the same vertical height. In addition to the indicated area of no offset, is an offset area A extending vertically above the area of no offset, and an offset area B extending vertically below the area of no offset. Crossmember portions can be offset by varying their attachment height within the no offset area and into the offset areas A and B. For maximum offset, a crossmember portion is attached at an uppermost height in offset area A on the left side of the illustrated center section and the other crossmember portion is attached at a lowermost height in offset area B on the right side of the illustrated center section.

As stated above, the amount of offset and height variation accommodated by the crossmember attachment areas of a center section preferably allows a single center section to be used in all variations of NASCAR speedways. Thus, the height and offset of the crossmember attachment areas may vary. The present invention contemplates a variety of ways to attach the crossmember portions to the center section, such as by inserting the crossmember portions into the crossmember attachment areas at the desired heights and then welding them in place.

It is to be understood that the present invention contemplates generally a center section for a crossmember, regardless of whether the suspension is trailing arm or the way in which the chassis is attached to the suspension. The present invention is intended to accommodate driving terrain and speedways other than those sponsored by NASCAR. Indeed, the heights of the crossmember attachment areas need not be offset, but rather could provide enough height to allow crossmembers to be attached in suitably offset positions without requiring the areas themselves to be offset. Further, the present invention contemplates having only one of the crossmember attachment areas having an extended height to allow offset, with the other attachment area having a fixed point of attachment.

What is claimed is:

1. A method of assembling a crossmember of a vehicle chassis, the crossmember comprising a center section and two side portions, the method comprising:
   forming the center section with crossmember attachment areas extending from opposing sides of a driveshaft hoop;
   inserting each side portion into a respective crossmember attachment area;
   adjusting each side portion vertically to a desired height with respect to the crossmember attachment area; and
   attaching each of the side portions to the respective crossmember attachment area at the desired height
   wherein heights of the crossmember attachment areas are vertically offset from each other to further allow attachment of crossmember portions to the center section at offset heights.

2. The method of claim 1, further comprising welding the side portions to the crossmember attachment areas.

3. The method of claim 1, wherein the center section comprises cast steel.

4. The method of claim 1, wherein the center section comprises aluminum or carbon fiber.

5. The method of claim 1, wherein the center section can be used in all variations of NASCAR speedways without being cut and trimmed separately for each configuration.

6. A center section for a crossmember of a vehicle chassis, the crossmember further comprising a first side portion having a first side portion area height and a second side portion having a second side portion area height, the center section comprising:
- a driveshaft hoop;
- a first crossmember attachment area having a first area height and extending from the driveshaft hoop in a first direction, the first crossmember attachment area comprising a first top surface configured to have a first vertical distance from the ground when the center section is in use; and
- a second crossmember attachment area having a second area height and extending from the driveshaft hoop in a second direction substantially opposite from the first direction, the second crossmember attachment area comprising a second top surface configured to have a second vertical distance from the ground when in use,
- wherein the second vertical distance is different than the first vertical distance, and
- wherein the first side portion is configured to attach to the first crossmember attachment area and the first side portion area height is less than the first area height of the first crossmember attachment area so that the first side portion can attach to the first crossmember attachment area at a variety of vertical heights, and
- wherein the second side portion is configured to attach to the second crossmember attachment area and the second side portion area height is less than the second area height of the second crossmember attachment area so that the second side portion can attach to the second crossmember attachment area at a variety of vertical heights.

7. The center section of claim 6, wherein a no offset portion of the first area height and a no offset portion of the second area height extend over the same vertical distance from the ground when the center section is in use, and
wherein a portion of the first area height extends vertically above the no offset portion of the first area height.

8. The center section of claim 7, wherein a portion of the second area height extends vertically below the no offset portion of the second area height.

9. The center section of claim 6, comprising cast steel.

10. The center section of claim 6, wherein the center section can be used in all variations of NASCAR speedways without being cut and trimmed separately for each configuration.

11. The center section of claim 6, wherein the first and second side portions are inserted into respective crossmember attachment areas so that a distance of the first side portion from the ground differs from a distance of the second side portion from the ground when the center section is in use.

12. The center section of claim 11, wherein the side portions are welded within the crossmember attachment areas.

* * * * *